Dec. 2, 1930.         S. L. GOLDSBOROUGH         1,783,568
                     ALTERNATING CURRENT RELAY
                        Filed Aug. 30, 1928
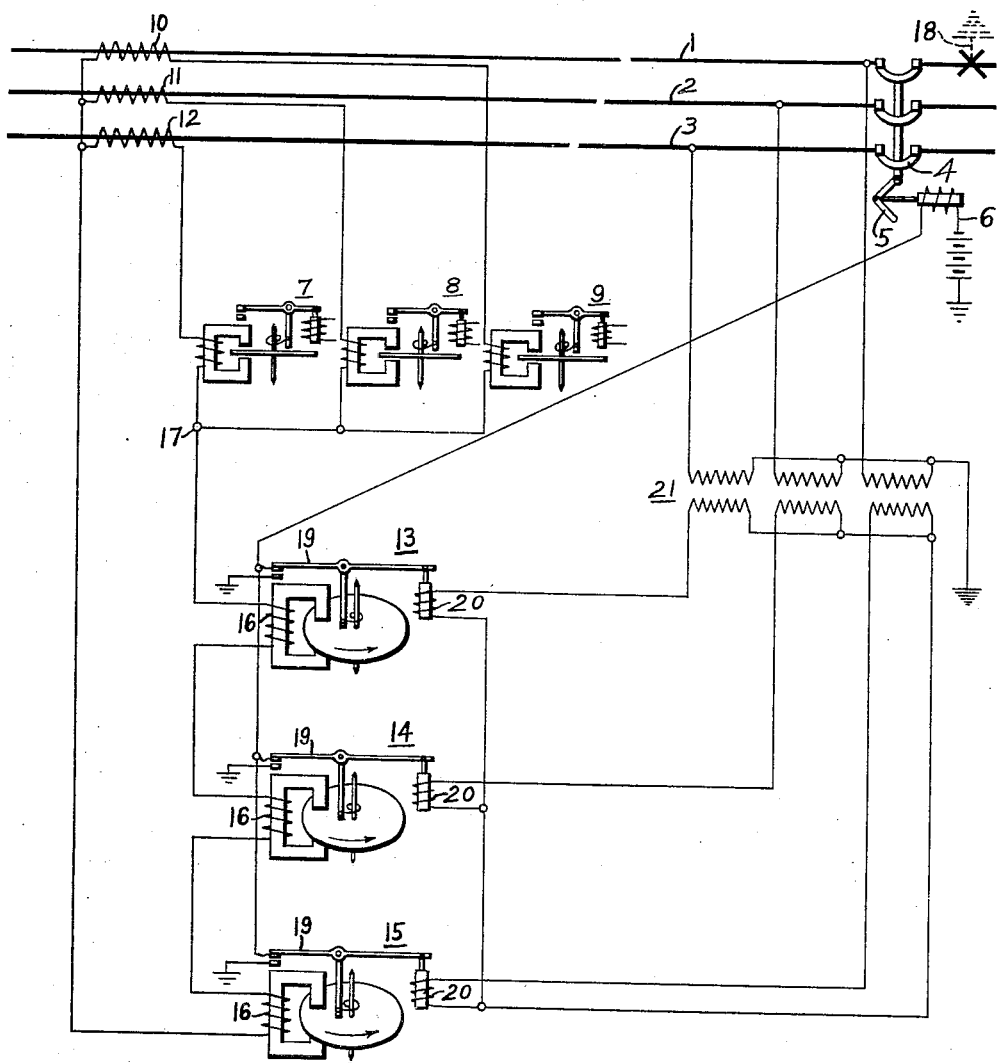
INVENTOR
Shirley L. Goldsborough
BY
ATTORNEY Patented Dec. 2, 1930

1,783,568

UNITED STATES PATENT OFFICE

SHIRLEY L. GOLDSBOROUGH, OF EAST ORANGE, NEW JERSEY, ASSIGNOR TO WESTINGHOUSE ELECTRIC & MANUFACTURING COMPANY, A CORPORATION OF PENNSYLVANIA

ALTERNATING-CURRENT RELAY

Application filed August 30, 1928. Serial No. 302,972.

My invention relates to protective systems and more particularly to a system for protecting a polyphase line against ground faults.

The object of my invention is the provision, in a polyphase circuit having circuit interrupters associated therewith, of relays for controlling the operation of said interrupters in accordance with the magnitude of a ground fault and in accordance with the distance from the relay to the fault.

It is a further object of my invention to provide, in a system of the above type, circuit connections for the relays whereby they are operable to actuate the circuit interrupters only upon the occurrence of a ground fault.

In practicing my invention, I provide a plurality of relays having actuating and restraining windings for controlling the operation of the circuit interrupters, means whereby the actuating windings are energized only upon the occurrence of a ground fault and in accordance with the magnitude thereof, and whereby the restraining windings are energized in accordance with the potential on the respective phase conductors.

In the drawings, the single figure is a circuit diagram illustrating a preferred embodiment of my invention.

Referring more particularly to the drawing, a polyphase circuit which is to be protected comprises three phase conductors 1, 2 and 3 having a circuit interrupter 4, associated therewith, which is actuated through a usual type of toggle mechanism 5 by a tripping solenoid 6.

A plurality of relays 7, 8 and 9 of the impedance type, the general theory of operation of which is disclosed in the patent to Crichton #1,292,585, issued January 28, 1919, are provided for the protection of the polyphase circuit and are operable in accordance with the magnitude of the current traversing said circuit and the distance between the source of power and faults involving two or more phase conductors of the line. These three relays are not essential to the present invention and are shown merely for the purpose of illustrating a complete protective system.

Current transformers 10, 11 and 12 are associated, respectively, with the three phase conductors and one of the terminals of each transformer is electrically connected to the corresponding terminals of the other transformers to effect a star or Y connection. The other terminals of the transformers are connected, respectively, to energize the current windings of the line relays 7, 8 and 9.

In order to afford protection against ground faults on the circuit, I provide impedance-responsive ground relays 13, 14 and 15 of a type similar to the relays 7, 8 and 9. Each of the relays is provided with an actuating winding 16, all of which are electrically connected in series circuit relation with each other and in circuit extending from the neutral point of the star connected transformers to the point 17 in the circuit of the current windings of the line relays 7, 8 and 9.

With the above connection, it is apparent that, under normal conditions in the circuit to be protected, no current will flow through the actuating windings 16, inasmuch as the circuit for energizing these windings is connected to the neutral point of the star connected transformer bank. Upon the occurrence of a ground fault in the conductor 1, for example such as indicated in dotted lines at the point 18, the currents induced in the star connected transformers will be unbalanced, and a current will flow through the actuating windings 16 of the three impedance-responsive ground relays.

The actuating winding 16 of each impedance relay is a part of an induction-meter element of known design, having a disc which tends to revolve with a force proportional to the square of the current in the actuating winding. The force of the disc is applied to a pivoted contact-arm 19 of the relay by means of a spring, as shown, in such manner as to bias said contact-arm to circuit-closing position, so as to energize the tripping coil 6, and thus effect the opening of the circuit interrupter 4.

In the present embodiment, the contacts of all three of the ground relays 13, 14 and 15 are connected in parallel so that the operation of any of them will actuate the circuit interrupter.

Each of the relays is provided with a restraining winding 20 which, when energized, biases the contact arm 19 to the open-circuit position thereof in opposition to the force exerted by the disk armature. The restraining windings 20 of the three ground relays are energized from a potential transformer bank 21 in such a manner that the three restraining windings are energized in accordance with the several line-to-ground voltages of the three phase-conductors of the line. The primary and secondary windings of the potential transformers are connected in star relation and the neutral point of the primary windings is grounded.

With the above described connections, it is apparent that the restraining windings 20 are energized in accordance with the line-to-ground potentials on the respective phase conductors, and the biasing effect of the windings on the contact arms 19 is in proportion to the squares of the phase potentials.

In operation, assuming that the phase conductor 1 is subjected to a ground fault as at 18, the balanced condition of the current transformers 10, 11 and 12 will be altered and a current will flow through the actuating windings 16 of the ground protective relays. The restraining windings 20 of the these relays will be energized in accordance with the potentials on the respective phase conductors, and will oppose the effect of the actuating windings 16.

The potential on the phase conductor 1, however, will be low because of the ground fault, and the restraining winding 20 of the relay 15 will not be sufficiently energized to prevent the movement of the contact arm 19 to close its contacts and effect the operation of the circuit interrupter 4.

Any well known means may be employed for effecting the current settings of the relays 13, 14 and 15 so that the relays are operable upon any predetermined minimum value of current traversing the actuating windings 16. It is apparent that since the current windings of the relays are not traversed by current during the normal operation of the circuit, the adjustment of current settings on the relays may be made without regard to the magnitude of the load current traversing the circuit. An adjustment may be made, therefore, whereby the relays are operable on an extremely low value of ground current, and the sensitivity of the relays is thereby increased.

It is apparent further that the energization of the restraining winding 20 of the relay 15 is in accordance with the potential drop between the ground fault 18 and the connection of the potential transformer 21 to the phase conductor. The energization of the remaining two restraining windings is approximately the normal value of potential and the operation of the two relays controlled thereby is prevented, or at least it is slower than the operation of the relay 15.

By my invention, I have provided a protective system employing relays of the impedance type whereby the current elements thereof are energized in proportion to the magnitude of a ground-fault, residual, or zero-phase-sequence current, and are energized only upon the occurrence of a ground fault, so that the sensitivity thereof may be adjusted for any desired minimum value of current without regard to the normal load current traversing the circuit to be protected.

Further, I have provided potential elements for the relays which are energized in accordance with the voltage on the respective phase conductors, and, in the case of a ground-fault, are energized in accordance with the potential drop on the phase conductor from the potential transformer connection to the fault, and, therefore, in accordance with the distance to the fault.

While I have shown and described three separate relays having mechanically independent contact means, it is clearly within the scope of my invention to employ a single relay having a single current winding and a plurality of restraining, or voltage windings for controlling a single contact arm.

Modifications of my invention may be made without departing from the spirit and scope thereof, and I desire, therefore, that only such limitations shall be placed thereon as are imposed by the prior art and set forth in the appended claims.

I claim as my invention:

1. The combination with a polyphase circuit having circuit interrupters associated with the phase conductors thereof, of means energized only upon the occurrence of a ground fault on said circuit for actuating said interrupters, and means for restraining said actuating means selectively in accordance with the potential on the respective phase conductors.

2. The combination with a polyphase circuit having circuit interrupters associated with the phase conductors thereof, of relays for controlling the operation of said interrupters, said relays each having an actuating winding and a restraining winding, means for energizing said actuating windings in response to a ground fault on said circuit, and means for energizing said restraining windings in accordance with the potential on the respective phase conductors.

3. The combination with a polyphase circuit having circuit interrupters associated with the phase conductors thereof, of relays for controlling the operation of said interrupters, said relays each having an actuating winding and a restraining winding, star connected current transformers associated with said circuit having the neutral point thereof connected in series-circuit relation with said actuating windings, and means for energizing said restraining windings in accordance with the potential on said phase conductors, respectively.

4. In a ground protective system for a three phase circuit, star-connected current transformer associated with said circuit, a plurality of current-actuated voltage-restrained relays having the current windings thereof connected to the neutral point of said transformer and the voltage windings thereof energized in accordance with the potential on the respective phase conductors.

5. In a ground protective system for a polyphase circuit, circuit interrupters associated with the phase conductors of said circuit, and means for controlling the operation of said interrupters comprising relays each having an actuating winding and a restraining winding, said windings being so associated with said circuit that said actuating windings are energized only upon the occurrence of a ground fault on said circuit, and said restraining windings are energized, respectively, in accordance with the potential on the phase conductors.

6. The combination with a polyphase circuit having circuit interrupters associated with the phase conductors thereof, of means energized only upon the occurrence of a ground fault on said circuit for actuating said interrupters, and means for restraining said actuating means selectively in accordance with the distance between the interrupters and said ground-fault.

7. The combination with a polyphase circuit having circuit interrupters associated with the phase conductors thereof, of means energized only upon the occurrence of a ground fault on said circuit of a predetermined magnitude for actuating said interrupters, and means for restraining said actuating means in accordance with the potential on said circuit.

8. The combination with a polyphase power line subject to ground faults and having a circuit breaker in series therewith, of a plurality of fault-distance responsive ground relays for tripping said circuit breaker in response to ground faults, comprising current coils and voltage coils, means for energizing said current coils in accordance with the residual line currents, and means for energizing the voltage coils of the respective relays in accordance with the respective phase-to-ground voltages of the line.

9. The combination with a three-phase power line subject to ground faults and having a cicuit breaker in series therewith, of relaying means for tripping said circuit breaker in response to ground faults, comprising three ground relay elements each having current-responsive windings and voltage-responsive windings, characterized by means for energizing said current-responsive windings in accordance with the residual line currents, and means for energizing the voltage-responsive windings of the respective relay elements in accordance with the respective line-to-ground voltages.

10. The combination with a three-phase power line subject to ground faults and having a circuit breaker in series therewith, of relaying means for tripping said circuit breaker in response to ground faults, comprising three impedance-responsive ground relays each having a current-responsive actuating element and a voltage-responsive restraining element, characterized by means for energizing said current-responsive elements in accordance with only the zero-sequence component of the line currents, and means for energizing said voltage-responsive elements in accordance with the respective Y-phase voltages of the line.

11. The combination with a three-phase power line subject to ground faults and having a circuit breaker in series therewith, of relaying means for tripping said circuit breaker in response to ground faults, comprising three impedance-responsive ground relays each having a current-responsive actuating element and a voltage-responsive restraining element, characterized by means for energizing said current-responsive elements in accordance with only the zero-sequence component of the line currents, and means for energizing said voltage-responsive elements in accordance with the respective Y-phase voltages of the line, and further characterized by the fact that said current-responsive actuating elements are of the induction-meter type having a rotatable disc.

In testimony whereof, I have hereunto subscribed my name this 13 day of August, 1928.

SHIRLEY L. GOLDSBOROUGH.